United States Patent
Chu et al.

(10) Patent No.: US 11,510,143 B1
(45) Date of Patent: *Nov. 22, 2022

(54) FREQUENCY DIVISION MULTIPLE ACCESS (FDMA) SUPPORT FOR WAKEUP RADIO (WUR) OPERATION

(71) Applicant: Marvell Asia Pte, Ltd., Singapore (SG)

(72) Inventors: Liwen Chu, San Ramon, CA (US); Rui Cao, Sunnyvale, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 40 days.

This patent is subject to a terminal disclaimer.

(21) Appl. No.: 17/124,795

(22) Filed: Dec. 17, 2020

Related U.S. Application Data

(63) Continuation of application No. 16/406,894, filed on May 8, 2019, now Pat. No. 10,873,909.

(Continued)

(51) Int. Cl.
*H04W 52/02* (2009.01)
*H04W 84/12* (2009.01)

(52) U.S. Cl.
CPC ........ *H04W 52/0229* (2013.01); *H04W 84/12* (2013.01)

(58) Field of Classification Search
CPC .......................... H04W 52/0229; H04W 84/12
See application file for complete search history.

(56) References Cited

U.S. PATENT DOCUMENTS 10,750,448 B2 * 8/2020 Huang .............. H04W 52/0219
10,873,909 B1 12/2020 Chu et al.
(Continued)

FOREIGN PATENT DOCUMENTS

CN 107800526 A 3/2018
WO WO-2018/032774 A1 2/2018

OTHER PUBLICATIONS

IEEE Std 802.11-REVmc™/D8.0 (revision of IEEE Std. 802.11 ™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

(Continued)

Primary Examiner — Jael M Ulysse

(57) ABSTRACT

An access point establishes a first communication channel as a primary channel of the access point, and transmits wakeup radio (WUR) beacon frames via a second communication channel, different than the first communication channel, that corresponds to a WUR primary channel. The access point negotiates, with a client station, a third communication channel, different than the first and second communication channels, via which the access point is to transmit wakeup frames for the client station. The access point generates a wakeup frame for transmission to the client station via the third communication channel, generates a wakeup packet to include at least the wakeup frame, and transmits the wakeup packet, including transmitting the wakeup frame to the client station via the third communication channel.

18 Claims, 8 Drawing Sheets

Related U.S. Application Data

(60) Provisional application No. 62/668,697, filed on May 8, 2018.

(56) References Cited

U.S. PATENT DOCUMENTS

| | | | | |
|---|---|---|---|---|
| 11,032,758 | B2* | 6/2021 | Hwang | H04W 52/02 |
| 2005/0250528 | A1 | 11/2005 | Song et al. | |
| 2009/0140876 | A1 | 6/2009 | Shi | |
| 2012/0119902 | A1 | 5/2012 | Patro | |
| 2012/0250537 | A1 | 10/2012 | Shatil et al. | |
| 2012/0320809 | A1 | 12/2012 | Sturm et al. | |
| 2014/0112225 | A1 | 4/2014 | Jafarian et al. | |
| 2014/0112229 | A1* | 4/2014 | Merlin | H04L 5/0055 370/311 |
| 2015/0036576 | A1 | 2/2015 | Jafarian et al. | |
| 2015/0195849 | A1* | 7/2015 | Bashar | H04L 5/0092 370/330 |
| 2015/0208349 | A1 | 7/2015 | Ramamurthy et al. | |
| 2016/0128128 | A1 | 5/2016 | Ang et al. | |
| 2016/0183187 | A1 | 6/2016 | Park | |
| 2016/0212703 | A1 | 7/2016 | Seok | |
| 2016/0366644 | A1 | 12/2016 | Ghosh et al. | |
| 2016/0374020 | A1 | 12/2016 | Azizi et al. | |
| 2017/0094600 | A1 | 3/2017 | Min et al. | |
| 2017/0111858 | A1* | 4/2017 | Azizi | H04L 5/0053 |
| 2017/0214567 | A1* | 7/2017 | Salkintzis | H04W 72/0413 |
| 2017/0280392 | A1* | 9/2017 | Segev | H04W 52/0235 |
| 2017/0280498 | A1 | 9/2017 | Min | |
| 2017/0332327 | A1 | 11/2017 | Fang et al. | |
| 2018/0019902 | A1 | 1/2018 | Suh et al. | |
| 2018/0020405 | A1 | 1/2018 | Huang et al. | |
| 2018/0069683 | A1* | 3/2018 | Huang | H04W 52/0222 |
| 2018/0103430 | A1* | 4/2018 | He | H04W 48/16 |
| 2018/0184379 | A1* | 6/2018 | Liu | H04W 52/0219 |
| 2018/0206192 | A1 | 7/2018 | Vermani et al. | |
| 2018/0255514 | A1* | 9/2018 | Sun | H04W 52/0229 |
| 2018/0288703 | A1* | 10/2018 | Sun | H04W 52/0229 |
| 2018/0317178 | A1 | 11/2018 | Wong | |
| 2018/0376419 | A1* | 12/2018 | Li | H04W 52/0222 |
| 2019/0014541 | A1* | 1/2019 | Li | H04W 52/0229 |
| 2019/0069239 | A1* | 2/2019 | Li | H04W 4/06 |
| 2019/0223104 | A1* | 7/2019 | Huang | H04W 52/0235 |
| 2019/0297575 | A1* | 9/2019 | Seok | H04W 52/0229 |
| 2019/0320389 | A1* | 10/2019 | Alanen | H04W 72/0446 |
| 2020/0178171 | A1* | 6/2020 | Lou | H04W 52/0225 |
| 2020/0296669 | A1* | 9/2020 | Azizi | H04L 27/2602 |
| 2021/0144645 | A1* | 5/2021 | Huang | H04W 52/0235 |
| 2022/0070785 | A1* | 3/2022 | Huang | H04W 52/0274 |

OTHER PUBLICATIONS

IEEE P802.11 ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

Park et al., "Proposal for Wake-Up Receiver (WUR) Study Group," IEEE Draft 802.11-16/0722r1, 14 pages (May 18, 2016).

\* cited by examiner

FREQUENCY DIVISION MULTIPLE ACCESS (FDMA) SUPPORT FOR WAKEUP RADIO (WUR) OPERATION

CROSS REFERENCES TO RELATED APPLICATIONS

This application is a continuation of U.S. patent application Ser. No. 16/406,894, now U.S. Pat. No. 10,873,909, entitled "Frequency Division Multiple Access (FDMA) Support for Wakeup Radio (WUR) Operation," filed on May 8, 2019, which claims the benefit of U.S. Provisional Patent Application No. 62/668,697, entitled "Frequency Division Multiple Access (FDMA) Support with Wake-Up (WUR) Radio," filed on May 8, 2018. Both applications identified above are hereby expressly incorporated herein by reference in their entireties.

FIELD OF TECHNOLOGY

The present disclosure relates generally to wireless communication systems, and more particularly to wireless communication systems utilizing low power wakeup radios to implement power saving features.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some WLANs include low cost wireless devices, such as wireless sensors, that do not require high data rates. To reduce operating costs, it is often useful for such wireless devices to be battery operated or otherwise power constrained. Power saving techniques for reducing power consumption are used with such power-constrained wireless devices. For example, a WLAN network interface of a power-constrained wireless device is put into to a low power state (e.g., a sleep state) for periods of time in order to decrease power consumption of the wireless device. When the wireless device is ready to transmit data to an access point, the WLAN network interface is transitioned to an active state so that the data can be transmitted. After the WLAN network interface transmits the data, the WLAN network interface transitions back to the low power state.

A WLAN network interface of a power-constrained wireless device may "wake up" periodically to listen for transmissions from the access point to determine whether the access point has data to transmit to the wireless device. However, such periodic "wake ups" by the WLAN network interface consume power even when the access point has no data to transmit to the wireless device. Therefore, to further reduce power consumption, some wireless devices employ a low power wake up radio (LP-WUR) that consumes much less power as compared to the WLAN network interface. For example, the LP-WUR does not include any transmitter circuitry and is capable of only receiving very low data rate transmissions. When the access point is ready to transmit data to the wireless device, the access point transmits a wakeup packet addressed to the wireless device. In response to receiving the wakeup packet and determining that the wakeup packet is addressed to the wireless device, the LP-WUR wakes up the WLAN network interface so that the WLAN network interface is ready to receive data from the access point.

SUMMARY

In an embodiment, a method for wireless communications includes: establishing, by an access point, a first communication channel as a primary channel of the access point; transmitting, by the access point, wakeup radio (WUR) beacon frames via a second communication channel that corresponds to a WUR primary channel, wherein the second communication channel is different than the first communication channel; negotiating with a first client station, at the access point, a third communication channel via which the access point is to transmit wakeup frames for the first client station, the third communication channel being different than the second communication channel; generating, at the access point, a first wakeup frame for transmission to the first client station via the third communication channel; generating, at the access point, a wakeup packet to include at least the first wakeup frame; and transmitting, by the access point, the wakeup packet, including transmitting the first wakeup frame to the first client station via the third communication channel.

In another embodiment, a communication device comprises a wireless network interface device associated with an access point. The wireless network interface device includes one or more integrated circuit (IC) devices configured to: establish a first communication channel as a primary channel of the access point; control the wireless network interface device to transmit WUR beacon frames via a second communication channel that corresponds to a WUR primary channel, wherein the second communication channel is different than the first communication channel; negotiate, with a first client station, a third communication channel via which the access point is to transmit wakeup frames for the first client station, the third communication channel being different than the second communication channel; generate a first wakeup frame for transmission to the first client station via the third communication channel; generate a wakeup packet to include at least the first wakeup frame; and control the wireless network interface device to transmit the wakeup packet, including transmitting the first wakeup frame to the first client station via the third communication channel.

In yet another embodiment, a method for wireless communications includes: determining, at a client station, that a first communication channel is a primary channel of an access point; tuning a wakeup radio of the client station to a second communication channel that corresponds to a WUR primary channel of the access point when the access point is to transmit WUR beacon frames, wherein the second communication channel is different than the first communication channel; receiving, at the client station, WUR beacon frames via the second communication channel; negotiating with the access point, at the client station, a third communication channel via which the client station is to receive wakeup frames for the client station, the third communication channel being different than the second communication channel; tuning the wakeup radio of the client station to the third communication channel to receive wakeup frames; receiving, at the client station, a first wakeup frame via the third communication channel; in response to receiving the first wakeup frame, transitioning a wireless network interface of the client station to an active state; and after transitioning the wireless network interface of the client station to the active state, transmitting, by wireless network interface of the client station, a packet via the first communication channel.

In still another embodiment, a communication device comprises: one or more IC devices, and a wireless network interface device associated with a client station. The wireless network interface device is implemented on the one or more IC devices and is configured to: determine that a first communication channel is a primary channel of an access point; and negotiate, with the access point, a second communication channel via which the client station is to receive wakeup frames for the client station. The communication device also comprises a wakeup radio coupled to the wireless network interface device. The wakeup radio is implemented on the one or more IC devices and is configured to: tune to a third communication channel that corresponds to a WUR primary channel of the access point when the access point is to transmit WUR beacon frames, wherein the second communication channel is different than the first communication channel; receive WUR beacon frames via the third communication channel; tune the wakeup radio to the second communication channel to receive wakeup frames; receive a first wakeup frame via the second communication channel; and in response to receiving the first wakeup frame, prompt the wireless network interface to transition to an active state. The wireless network interface device is further configured to, after transitioning to the active state, transmit a packet via the first communication channel.

DETAILED DESCRIPTION

Low power wakeup techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, the same or similar power saving techniques are utilized in other types of wireless communication systems such as personal area networks (PANs), mobile communication networks such as cellular networks, metropolitan area networks (MANs), satellite communication networks, etc.

In an embodiment, a first communication device (e.g., an AP) is configured to negotiate respective wakeup radio operating channels with one or more second communication devices (e.g., one or more client stations), the respective wakeup radio operating channels occupying respective different frequency portions of an operating channel of the first communication device. The first communication device is configured to use the respective wakeup radio operating channels negotiated with the one or more second communication device to transmit wakeup request packets to the corresponding ones of the one or more second communication devices. For example, the first communication device simultaneously transmits respective wakeup requests to multiple second communication devices in the respective wakeup radio operating channels negotiated with the respective second communication devices. Negotiating respective wakeup radio operating channels, and utilizing the respective negotiated wakeup radio operating channel to transmit respective wakeup packets to the plurality of second communication devices, allows the first communication to more efficiently utilize its operating channel for wakeup radio operations as compared to systems that, for example, utilize a single wakeup radio operating channel to transmit respective wakeup packets to a plurality of second communication devices, in at least some embodiments.

Figure 1A:
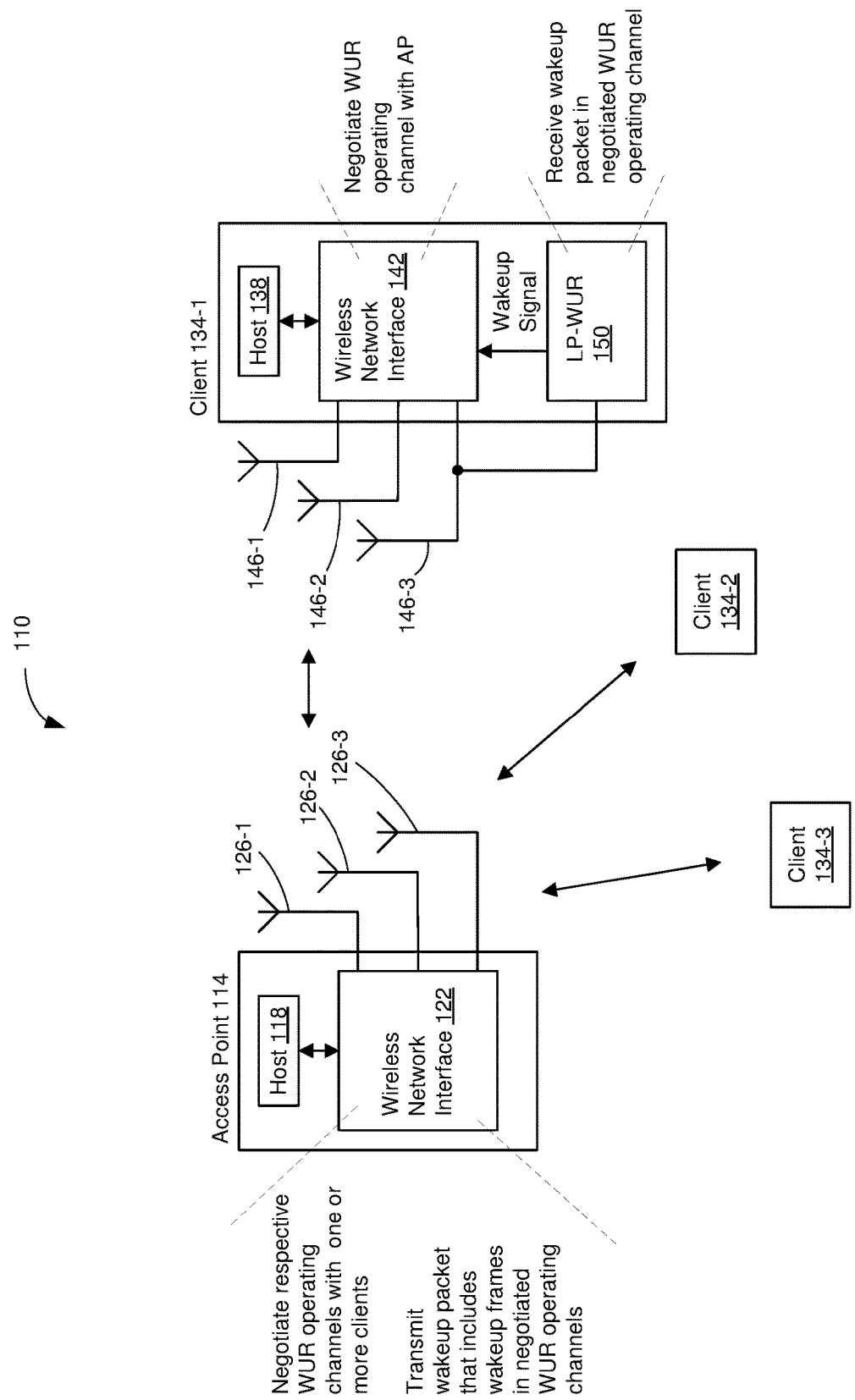
FIG. 1A is a block diagram of an example wireless local area network (WLAN) having a client station with a low power wake up radio (LP-WUR), according to an embodiment.

FIG. 1A is a block diagram of an example WLAN 110, according to an embodiment. The WLAN 110 includes an access point (AP) 114 that comprises a host processor 118 coupled to a wireless network interface device 122. The wireless network interface device 122 is coupled to a plurality of antennas 126. Although three antennas 126 are illustrated in FIG. 1A, the AP 114 includes other suitable numbers (e.g., 1, 2, 4, 5, etc.) of antennas 126 in other embodiments. As will be described in more detail below, the wireless network interface device 122 is configured to generate and transmit a wakeup packet that can be decoded by low power wake up radios (LP-WURs) in the WLAN 110.

The host processor 118 is configured to executed machine readable instructions stored in a memory device (not shown), according to an embodiment. The host processor 118 is implemented on an integrated circuit (IC), according to an embodiment. The wireless network interface device 122 is implemented on one or more ICs. The host processor 118 is implemented on one IC and the wireless network interface device 122 is implemented on one or more other, different ICs, according to an embodiment. The host processor 118 is implemented on a first IC and the wireless network interface device 122 is implemented on at least the same first IC and optionally on one or more second ICs, according to an embodiment.

The WLAN 110 also includes one or more client stations 134. Although three client stations 134 are illustrated in FIG. 1A, the WLAN 110 includes other suitable numbers (e.g., 1, 2, 4, 5, 6, etc.) of client stations 134 in various embodiments. The client station 134-1 includes a host processor 138 coupled to a wireless network interface device 142. The wireless network interface device 142 is coupled to one or more antennas 146. Although three antennas 146 are illustrated in FIG. 1A, the client station 134-1 includes other suitable numbers (e.g., 1, 2, 4, 5, etc.) of antennas 146 in other embodiments.

The wireless network interface device 142 is configured to go into a low power state in which the wireless network interface device 142 consumes significantly less power as compared to an active state of the wireless network interface device 142. The wireless network interface device 142 is capable of wirelessly receiving and transmitting via the one or more antennas 146 while in the active state. In an embodiment, the wireless network interface device 142 is incapable of wirelessly receiving and transmitting via the one or more antennas 146 while in the low power state.

The client station 134-1 also includes a LP-WUR 150 coupled to the wireless network interface device 142 and to at least one of the antennas 146. The LP-WUR 150 is configured to use very low power (e.g., less than 100 microwatts or another suitable amount of power). The LP-WUR 150 is configured to use significantly less power (e.g., less than 20%, less than 10%, less than 5%, less than 2%, less than 1%, etc.) than the wireless network interface device 142 while the wireless network interface device 142 is in the active state, according to an embodiment.

The LP-WUR 150 is configured to operate over a smaller bandwidth (e.g., less than 50%, less than 25%, less than 20%, less than 10%) than the bandwidth of an operating channel of the wireless network interface device 142 while the wireless network interface device 142 is in the active state, in an embodiment. For instance, in an embodiment, the LP-WUR 150 operates over a communication channel that is approximately 4 MHz wide (e.g. 4.06 MHz wide) while the wireless network interface device 142, in an active state, operates over a wider communication channel that is 20 MHz wide. In an embodiment, the LP-WUR 150 operates over a communication channel that is centered within the operating channel of the wireless network interface device 142. In another embodiment, the LP-WUR 150 operates over a communication channel operates over a communication channel that is different from the operating channel of the wireless network interface device 142. In another embodiment however, the LP-WUR 150 is configured to operate over a bandwidth that is equal or substantially equal to an operating bandwidth of the wireless network interface device 142 while the wireless network interface device 142 is in the active state. In an embodiment, the wireless network interface device 142, in an active state, is further configured to operate over a communication channel that is wider than 20 MHz (e.g., 40 MHz, 80 MHz, 160 MHz, etc.).

The LP-WUR 150 is configured to receive and decode wakeup packets transmitted by the AP 114 and received via one or more of the antennas 146. The LP-WUR 150 is configured to determine whether a received wakeup packet includes an address (e.g., a media access control (MAC) address, an association identifier (AID), or another suitable network address) corresponding to the client station 134-1, according to an embodiment. The LP-WUR 150 is configured to generate a wakeup signal in response to determining that a received wakeup packet includes the address corresponding to the client station 134-1. An address corresponding to the client station 134-1 includes one or more of i) a unicast address corresponding to the client station 134-1, ii) a multicast address corresponding to a group of client stations that includes the client station 134-1, and/or iii) a broadcast address that corresponds to all client stations, in various embodiments.

When the wireless network interface device 142 is in the low power state and receives the wakeup signal from the LP-WUR 150, the wireless network interface device 142 is configured to transition to the active power state in response to the wakeup signal, according to an embodiment. For example, when the wireless network interface device 142 is in the low power state and receives the wakeup signal from the LP-WUR 150, the wireless network interface device 142 responsively transitions to the active power state to become ready to transmit and/or receive, according to an embodiment.

The host processor 138 is configured to execute machine readable instructions stored in a memory device (not shown), according to an embodiment. The host processor 138 is implemented on an IC, according to an embodiment. The wireless network interface device 142 is implemented on one or more ICs. The host processor 138 is implemented on one IC and the wireless network interface device 142 is implemented on one or more other, different ICs, according to an embodiment. The host processor 138 is implemented on a first IC and the wireless network interface device 142 is implemented on at least the same first IC and optionally on one or more second ICs, according to an embodiment.

The LP-WUR 150 is implemented on one IC and the wireless network interface device 142 is implemented on one or more other, different ICs, according to an embodiment. The LP-WUR 150 is implemented on a first IC and the wireless network interface device 142 is implemented on at least the same first IC and optionally on one or more second ICs, according to an embodiment.

In an embodiment, each of the client stations 134-2 and 134-3 has a structure that is the same as or similar to the client station 134-1. For example, one or both of the client stations 134-2 and 134-3 includes a respective LP-WUR, according to an embodiment. As another example, one or both of the client stations 134-2 and 134-3 does not include a LP-WUR, according to another embodiment. Each of the client stations 134-2 and 134-3 has the same or a different number of antennas (e.g., 1, 2, 3, 4, 5, etc.). For example, the client station 134-2 and/or the client station 134-3 each have only two antennas (not shown), according to an embodiment.

Figure 1B:
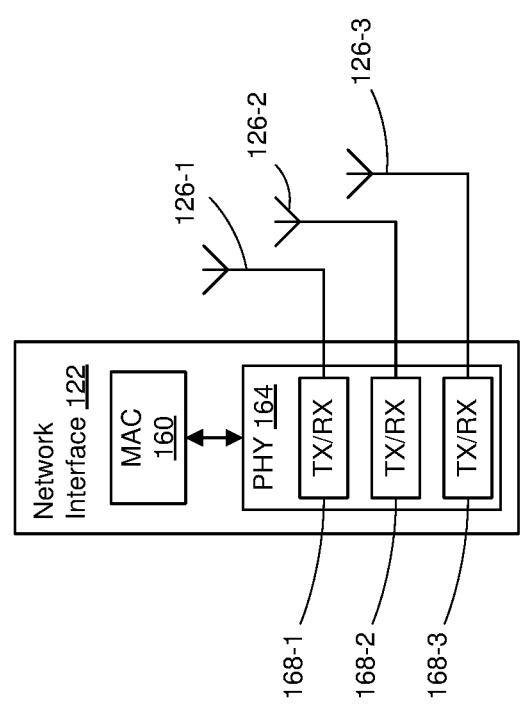
FIG. 1B is a block diagram of an example wireless network interface device of an access point included in the WLAN of FIG. 1A, according to an embodiment.

FIG. 1B is a block diagram of the wireless network interface device 122 of the AP 114 of FIG. 1A, according to an embodiment. The wireless network interface device 122 includes a MAC layer processor 160 coupled to a physical layer (PHY) processor 164. The PHY processor 164 includes a plurality of transceivers 168 coupled to the plurality of antennas 126. Although three transceivers 168 and three antennas 126 are illustrated in FIG. 1B, the PHY processor 164 includes other suitable numbers (e.g., 1, 2, 4, 5, etc.) of transceivers 168 coupled to other suitable numbers of antennas 126 in other embodiments. In some embodiments, the AP 114 includes a higher number of antennas 126 than transceivers 168, and the PHY processor 164 is configured to use antenna switching techniques.

The wireless network interface device 122 is implemented using one or more ICs configured to operate as discussed below. For example, the MAC layer processor 160 is implemented, at least partially, on a first IC, and the PHY processor 164 may be implemented, at least partially, on a second IC, in an embodiment. As another example, at least a portion of the MAC layer processor 160 and at least a portion of the PHY processor 164 are implemented on a single IC, in another embodiment. For instance, the wireless network interface device 122 is implemented using a system on a chip (SoC), where the SoC includes at least a portion of the MAC layer processor 160 and at least a portion of the PHY processor 164, in an embodiment.

In various embodiments, the MAC layer processor 160 and/or the PHY processor 164 of the AP 114 are configured to generate data units, and process received data units, that conform to a WLAN communication protocol such as a communication protocol conforming to the IEEE 802.11 Standard or another suitable wireless communication protocol. For example, in an embodiment, the MAC layer processor 160 is configured to implement MAC layer functions, including MAC layer functions of the WLAN communication protocol, and the PHY processor 164 is configured to implement PHY functions, including PHY functions of the WLAN communication protocol. For instance, the MAC layer processor 160 is configured to generate MAC layer data units such as MAC service data units (MSDUs), MAC protocol data units (MPDUs), etc., and provide the MAC layer data units to the PHY processor 164, in an embodiment. The PHY processor 164 is configured to receive MAC layer data units from the MAC layer processor 160 and encapsulate the MAC layer data units to generate PHY data units such as PHY protocol data units (PPDUs) for transmission via the antennas 126, in an embodiment. Similarly, the PHY processor 164 is configured to receive PHY data units that were received via the antennas 126, and extract MAC layer data units encapsulated within the PHY data units, in an embodiment. In an embodiment, the PHY processor 164 provides the extracted MAC layer data units to the MAC layer processor 160, which then processes the MAC layer data units.

In connection with generating one or more radio frequency (RF) signals for transmission, the PHY processor 164 is configured to process (which includes, for example, modulating, filtering, etc.) data corresponding to a PPDU to generate one or more digital baseband signals, and convert the digital baseband signal(s) to one or more analog baseband signals, according to an embodiment. Additionally, the PHY processor 164 is configured to upconvert the one or more analog baseband signals to one or more RF signals for transmission via the one or more antennas 126.

In connection with receiving one or more RF signals, the PHY processor 164 is configured to downconvert the one or more RF signals to one or more analog baseband signals, and to convert the one or more analog baseband signals to one or more digital baseband signals. The PHY processor 164 is further configured to process (which includes, for example, demodulating, filtering, etc.) the one or more digital baseband signals to generate a PPDU.

The PHY processor 164 includes amplifiers (e.g., a low noise amplifier (LNA), a power amplifier, etc.), a radio frequency (RF) downconverter configured to downconvert received RF signals to baseband signals, an RF upconverter configured to upconverter baseband signals to RF signals for transmission, a plurality of filters, one or more analog-to-digital converters (ADCs) configured to convert analog baseband signals to digital signals for processing, one or more digital-to-analog converters (DACs) configured to convert digital signals to analog signal, one or more discrete Fourier transform (DFT) calculators (e.g., a fast Fourier transform (FFT) calculator) configured to convert time-domain signals to, one or more inverse discrete Fourier transform (IDFT) calculators (e.g., an inverse fast Fourier transform (IFFT) calculator) configured to convert constellation symbols to time-domain signals, one or more modulators configured to modulate signals for transmission, one or more demodulators configured to demodulate received signals, etc.

The PHY processor 164 is configured to generate one or more RF signals that are provided to the one or more antennas 126. The PHY processor 164 is also configured to receive one or more RF signals from the one or more antennas 126.

The MAC processor 160 is configured to control the PHY processor 164 to generate one or more RF signals by, for example, providing one or more MAC layer data units (e.g., MPDUs) to the PHY processor 164, and optionally providing one or more control signals to the PHY processor 164, according to some embodiments. In an embodiment, the MAC processor 160 includes a processor configured to execute machine readable instructions stored in a memory device (not shown) such as a RAM, a read ROM, a flash memory, etc. In an embodiment, the MAC processor 160 includes a hardware state machine.

Figure 1C:
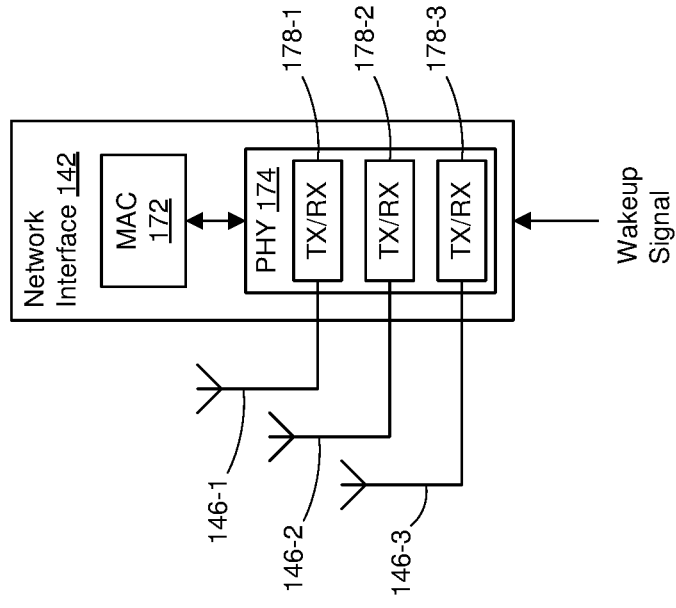
FIG. 1C is a block diagram of an example wireless network interface device of the client station included in the WLAN of FIG. 1A, according to an embodiment.

FIG. 1C is a block diagram of the wireless network interface device 142 of the client station 134-1 of FIG. 1A, according to an embodiment. The wireless network interface device 142 includes a MAC layer processor 172 coupled to a PHY processor 174. The PHY processor 174 includes a plurality of transceivers 178 coupled to the one or more antennas 146. Although three transceivers 178 and three antennas 146 are illustrated in FIG. 1C, the PHY processor 174 includes other suitable numbers (e.g., 1, 2, 4, 5, etc.) of transceivers 178 coupled to other suitable numbers of antennas 146 in other embodiments. In some embodiments, the client station 134-1 includes a higher number of antennas 146 than transceivers 178, and the PHY processor 174 is configured to use antenna switching techniques.

The wireless network interface device 142 is implemented using one or more ICs configured to operate as discussed below. For example, the MAC layer processor 172 is implemented, at least partially, on a first IC, and the PHY processor 174 is implemented, at least partially, on a second IC, in an embodiment. As another example, at least a portion of the MAC layer processor 172 and at least a portion of the PHY processor 174 are implemented on a single IC, in another embodiment. For instance, the wireless network interface device 142 is implemented using a system on a chip (SoC), where the SoC includes at least a portion of the MAC layer processor 172 and at least a portion of the PHY processor 174, in an embodiment.

In various embodiments, the MAC layer processor 172 and the PHY processor 174 of the client station 134-1 are configured to generate data units, and process received data units, that conform to the WLAN communication protocol such as a communication protocol conforming to the IEEE 802.11 Standard or another suitable wireless communication protocol. For example, in an embodiment, the MAC layer processor 172 is configured to implement MAC layer functions, including MAC layer functions of the WLAN communication protocol, and the PHY processor 174 is configured to implement PHY functions, including PHY functions of the WLAN communication protocol. The MAC layer processor 172 is configured to generate MAC layer data units such as MSDUs, MPDUs, etc., and provide the MAC layer data units to the PHY processor 174, in an embodiment. The PHY processor 174 is configured to receive MAC layer data units from the MAC layer processor 172 and encapsulate the MAC layer data units to generate PHY data units such as PPDUs for transmission via the one or more antennas 146, in an embodiment. Similarly, the PHY processor 174 is configured to receive PHY data units that were received via the one or more antennas 146, and extract MAC layer data units encapsulated within the PHY data units, in an embodiment. In an embodiment, the PHY processor 174 provides the extracted MAC layer data units to the MAC layer processor 172, which then processes the MAC layer data units.

As discussed above, the wireless network interface device 142 is configured to transition between an active state and a low power state. When the wireless network interface device 142 is in the low power state and receives the wakeup signal from the LP-WUR 150, the wireless network interface device 142 is configured to transition to the active power state in response to the wakeup signal, according to an embodiment.

The PHY processor 174 is configured to downconvert one or more RF signals received via the one or more antennas 146 to one or more baseband analog signals, and convert the analog baseband signal(s) to one or more digital baseband signals, according to an embodiment. The PHY processor 174 is further configured to process the one or more digital baseband signals to demodulate the one or more digital baseband signals and to generate a PPDU. The PHY processor 174 includes amplifiers (e.g., a low noise amplifier (LNA), a power amplifier, etc.), a radio frequency (RF) downconverter configured to downconvert received RF signals to baseband signals, an RF upconverter configured to upconverter baseband signals to RF signals for transmission, a plurality of filters, one or more analog-to-digital converters (ADCs) configured to convert analog baseband signals to digital signals for processing, one or more digital-to-analog converters (DACs) configured to convert digital signals to analog signal, one or more discrete Fourier transform (DFT) calculators (e.g., a fast Fourier transform (FFT) calculator) configured to convert time-domain signals to, one or more inverse discrete Fourier transform (IDFT) calculators (e.g., an inverse fast Fourier transform (IFFT) calculator) configured to convert constellation symbols to time-domain signals, one or more modulators configured to modulate signals for transmission, one or more demodulators configured to demodulate received signals, etc.

The PHY processor 174 is configured to generate one or more RF signals that are provided to the one or more antennas 146. The PHY processor 174 is also configured to receive one or more RF signals from the one or more antennas 146.

The MAC processor 172 is configured to control the PHY processor 174 to generate one or more RF signals by, for example, providing one or more MAC layer data units (e.g., MPDUs) to the PHY processor 174, and optionally providing one or more control signals to the PHY processor 174, according to some embodiments. In an embodiment, the MAC processor 172 includes a processor configured to execute machine readable instructions stored in a memory device (not shown) such as a RAM, a read ROM, a flash memory, etc. In an embodiment, the MAC processor 172 includes a hardware state machine.

Figure 1D:
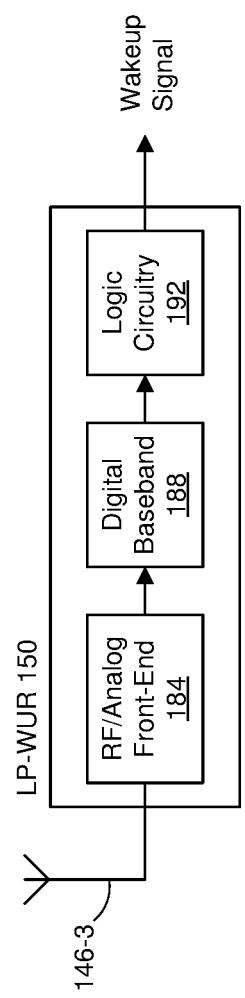
FIG. 1D is a block diagram of an example LP-WUR in the WLAN of FIG. 1A, according to an embodiment.

FIG. 1D is a block diagram of the LP-WUR 150 of the client station 134-1 of FIG. 1A, according to an embodiment. The LP-WUR 150 includes radio frequency (RF)/analog front-end circuitry 184 coupled to at least one of the antennas 146. The RF/analog front-end circuitry 184 includes one or more amplifiers (e.g., a low noise amplifier (LNA)), an RF downconverter, one or more filters, and one or more analog-to-digital converters (ADCs). In an embodiment, the RF/analog front-end circuitry 184 is configured to downconvert an RF signal to a baseband analog signal, and convert the analog baseband signal to a digital baseband signal.

The RF/analog front-end circuitry 184 is coupled to digital baseband circuitry 188. The digital baseband circuitry 188 is configured to process the digital baseband signal to determine whether the digital baseband signal corresponds to a wakeup packet. The digital baseband circuitry 188 includes a demodulator that demodulates data from the digital baseband signal to generate an information signal corresponding to information included in a wakeup packet.

The digital baseband circuitry 188 is coupled to logic circuitry 192. The logic circuitry 192 is configured to process the information signal to determine whether a wakeup packet includes an address (e.g., a MAC address, an AID, or another suitable network address) corresponding to the client station 134-1, according to an embodiment. The logic circuitry 192 is configured to generate the wakeup signal in response to determining that a received wakeup packet includes the address corresponding to the client station 134-1. The logic circuitry 192 is configured to generate the wakeup signal in response to determining that a received wakeup packet includes the address corresponding to the client station 134-1. In various embodiments and/or scenarios, the network address included in the wakeup packet comprises a unicast address, a multicast address, or a broadcast address. For example, a broadcast network address generally corresponds to all client stations having an LP-WUR, according to an embodiment. As another example, a multicast network address corresponds to the client station 134-1 if the client station 134-1 has been assigned to a group of client stations (e.g., by the AP 114) that is associated with the multicast network address, according to an embodiment. As yet another example, a unicast network address is be assigned to the client station 134-1 at time of manufacture, assigned by the AP 114 when the client station 134 becomes associated with the network 110, etc., according to various embodiments.

In an embodiment, the wireless network interface device 122 of the AP 114 is configured to operate with an operating channel that includes multiple component channels, including a primary channel and one or more non-primary (secondary) channels. In an embodiment, each of the component channels of the operating channel of the wireless network interface device 122 spans a respective 20 MHz frequency portion of the operating channel of the wireless network interface device 122. For example, the wireless network interface device 122 is configured to operate with a 40 MHz operating channel that includes two component channels, each component channel spanning a 20 MHz frequency bandwidth, in an embodiment. As another embodiment, the wireless network interface device 122 is configured to operate with an 80 MHz operating channel that includes four component channels, each component channel spanning a 20 MHz frequency bandwidth. In other embodiments, the operating channel of the wireless network interface device 122 of the AP 114 operates with an operating channel that includes other suitable numbers of component channels and/or component channels that span other suitable bandwidths.

In various embodiments, an LP-WUR of a client station 134 (e.g., the LP-WUR 150 of the client station 134-1) is configured to operate with a wakeup radio (WUR) operating channel that is the same as or different from the operating channel of the wireless network interface device 122 of the AP 114. In an embodiment, the AP 114 (e.g., the wireless network interface device 122) is configured to negotiate with a client station 134 (e.g., the client station 134-1 or the wireless network interface device 142 of the client station 134-1) a wakeup radio operating channel in which the LP-WUR 150 of the client station 134 is to operate. The wakeup radio operating channel negotiated between the AP 114 and the client station 134 corresponds to a particular component channel of the operating channel of the wireless network interface device 122 of the AP 114, in an embodiment. For example, the negotiated wakeup radio operating channel of the client station 134 spans a portion of a particular component channel of the operating channel of the wireless network interface device 122 of the AP 114, in an embodiment.

In an embodiment, negotiation of a wakeup radio operating channel between the AP 114 and a particular client station 134 (e.g., the client station 134-1) includes an exchange of management or action frames between the AP 114 and the client station 134-1. For example, the wireless network interface device 122 is configured to receive a management or an action frame transmitted by the client station 134-1 (e.g., by wireless network interface device 142). The management or action frame is, for example, a probe or an association request frame transmitted by the client station 134-1 to initiate association with the AP 114, in an embodiment. In another embodiment, the management or action frame is a request frame (e.g., a "WUR operating channel request" frame) specifically designated for wakeup radio operating channel negotiations. In an embodiment, the management or action frame includes a wakeup radio operating channel element, which, in turn, includes an indication of a particular wakeup radio operating channel, or a particular component channel corresponding to the particular wakeup radio operating channel, being requested for wakeup radio operations by the client station 134-1. In an embodiment, the indication of the particular component channel being requested by the client station 134-1 for wakeup radio operations comprises i) a first field (e.g., a 1-octet field or another suitable field) that indicates an operating class of the component channel and ii) a second field (e.g., a 1-octet field or another suitable field) that indicates a channel number of the component channel. In another embodiment, the particular wakeup radio operating channel, or the particular component channel corresponding to the particular wakeup radio operating channel, being requested by the client station 134-1 is indicated in the wakeup radio operating channel element in another suitable manner.

In an embodiment, upon receiving the management or action frame from the client station 134-1, the wireless network interface device 122 of the AP 114 transmits a response frame (e.g., an association response frame, a wakeup radio operating channel response frame, or another suitable response frame) to the client station 134-1. The response frame indicates that the particular wakeup radio operating channel, or the particular component channel corresponding to the particular wakeup radio operating channel, is accepted by the AP 114 or, alternatively, includes an indication of a different wakeup radio operating channel, or a different component channel, to be used as the wakeup radio operating channel by the client station 134-1, in an embodiment. The client station 134-1 (e.g., the wireless network interface device 142) is configured to receive the response frame transmitted by the AP 114, and to tune the LP-WUR radio 150 to operate in the particular wakeup radio operating channel negotiated between the client station 134-1 and the AP 114, in accordance with the indication in the response frame received from the AP 114, in an embodiment. Subsequently, when the wireless network interface device 142 of the client station 134-1 is operating in a low power state, the LP-WUR 150 operates to receive wakeup packets from the AP 114 in the particular wakeup radio operating channel negotiated between the client station 134-1 and the AP 114, in an embodiment.

In an embodiment, the wakeup radio operating channel of the LP-WUR 150 of the client station 134 is independent of an operating channel of the wireless network interface device 142 of the client station 134 when the wireless network interface device 142 is operating in an active state. For example, the operating channel of the wireless network interface device 142 of the client station 134 spans one or more first component channels of the operating channel of the wireless network interface device 122 of the AP 114, and the wakeup radio operating channel of the LP-WUR 150 of the client station 134 operates in a second component channel of the wireless network interface device 122 of the AP 114, in an embodiment. The second component channel in which the wakeup radio operating channel of the LP-WUR 150 of the client station 134 operates when the wireless network interface device 142 of the client station 134 is in a low power state is not necessarily included in the set of the one or more first operating channels in which the wireless network interface device 142 of the client station 134 operates when the wireless network interface device 142 is in an active state, in an embodiment. After transitioning to an active state in response to a wakeup packet received by the LP-WUR 150 in the second component channel, the wireless network interface device 142 begins operation with the operating channel that spans the first one or more component channels, in an embodiment.

Figure 2:
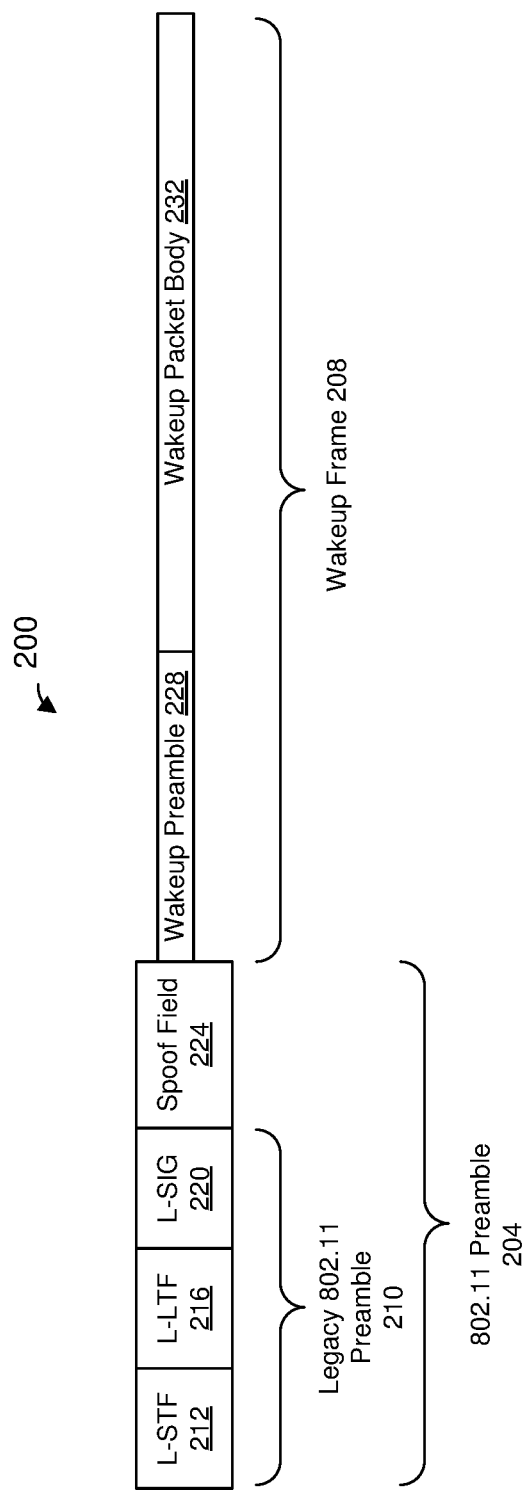
FIG. 2 is a block diagram of an example wakeup packet, according to an embodiment.

FIG. 2 is a block diagram of a wakeup packet 200 used in the example WLAN 110 of FIG. 1, according to an embodiment. The wireless network interface device 122 of the AP 114 is configured to generate and transmit the wakeup packet 200 to prompt one or more client station 134 to wake up from a low power state (e.g., to transition from a low power state to an active state), according to an embodiment. The wakeup packet 200 is a single user (SU) wakeup packet configured to prompt a single client station 134 (e.g., the client station 134-1) to wake up from a low power state, in an embodiment. In another embodiment, the wakeup packet 200 is a multi-user (MU) wakeup packet configured to prompt a group of multiple client stations 134 (e.g., a group of client stations 134 that includes the client station 134-1) to wake up from a low power state. The wireless network interface device 122 of the AP 114 is configured to transmit the wakeup packet 200 in a particular component channel, of the operating channel of the wireless network interface device 122, that includes the wakeup radio operating channel previously negotiated between the AP 114 and the client station (or stations) 134, in an embodiment. The LP-WUR 150 of the client station 134-1 is configured to receive, detect, and decode the wakeup packet 200 in the wakeup radio operating channel of the LP-WUR 150 that was previously negotiated between the AP 114 and the client station 134-1, according to an embodiment. The wireless network interface device 142 of the client station 134-1 is also configured to generate and transmit the wakeup packet 200, e.g., to prompt one or more other client station 134 to wake up from a low power state, according to another embodiment.

The wakeup packet 200 includes an 802.11 preamble portion 204 and a payload that includes a wakeup frame 208. The 802.11 preamble portion 204 enables IEEE 802.11 stations (e.g., wireless communication devices that are configured to operate according to the IEEE 802.11 Standard) to detect the wakeup packet 200 and determine a length of the wakeup packet 200 for the purpose of reducing transmissions by IEEE 802.11 stations that will collide with the wakeup packet 200, according to an embodiment.

The 802.11 preamble portion 204 includes a legacy 802.11 preamble 210, which corresponds to a legacy preamble defined by the IEEE 802.11 Standard, according to an embodiment. The legacy 802.11 preamble 210 includes a legacy short training field (L-STF) 212, a legacy long training field (L-LTF) 216, a legacy signal field (L-SIG) 220. The L-STF 212 includes signals designed for packet detection and automatic gain control (AGC) training. The L-LTF 216 includes signals designed for channel estimation and synchronization. The L-SIG 220 includes information regarding the wakeup packet 200, including length information (e.g., in a length subfield (not shown)) that can be used by IEEE 802.11 stations to determine when the wakeup packet 200 will end.

In other embodiments, the wakeup packet 200 includes a legacy preamble (different than the legacy 802.11 preamble 210) that enables stations that conform to a different suitable wireless communication protocol (e.g., other than the IEEE 802.11 Standard) to detect the wakeup packet 200 and determine a length of the wakeup packet 200 for the purpose of reducing transmissions by such stations that will collide with the wakeup packet 200, according to an embodiment.

In an embodiment, the 802.11 preamble portion 204 also includes a spoof field 224 that follows the legacy 802.11 preamble 210. The spoof field 224 is configured to cause communication devices operating according to the IEEE 802.11 Standard to fail detection of the wakeup packet 200 as an 802.11 packet, and to thereby cause the communication devices operating according to the IEEE 802.11 Standard to discard the wakeup packet 200, in an embodiment. The spoof field 224 is modulated using binary phase shift keying (BPSK) modulation to cause communication devices operating according to the IEEE 802.11 Standard to fail detecting of the wakeup packet 200 as an 802.11 packet, in an embodiment. In other embodiments, the spoof field 224 is modulated using other suitable modulations.

In an embodiment, the spoof field 224 is a repetition of the L-SIG 220. In an embodiment, the spoof field 224 is identical to at least a portion of the L-LTF 216. In other embodiments, the spoof field 224 includes any other suitable signal and/or information. In an embodiment, the spoof field 224 does not convey any useful information to recipient communication devices. In another embodiment, the spoof field 224 does convey useful information to recipient communication devices. For example, in an embodiment, wakeup packet data (e.g., which includes a network address corresponding to an intended client station or stations) is encoded within/on a set of OFDM symbols that includes the spoof field 224 and the wakeup frame 208. In some embodiments, the spoof field 224 is omitted from the wakeup packet 200.

The wakeup frame 208 includes a wakeup preamble 228. In an embodiment, the wakeup preamble 228 includes signals that enable LP-WURs such as the LP-WUR 150 to detect the wakeup packet 200 and to synchronize to the wakeup packet 200. The wakeup frame 208 also includes a wakeup packet data portion 232. In an embodiment, the wakeup packet data portion 232 includes an address (e.g., a MAC address, an AID, or another suitable network address) corresponding to a client station (or client stations) to which the wakeup packet 200 is intended. Referring now to FIG. 1D, the digital baseband circuitry 188 is configured to detect the wakeup packet 200 at least by detecting the wakeup preamble 228, according to an embodiment. The logic circuitry 192 is configured to process the wakeup packet body 232 to determine whether the wakeup packet body 232 includes an address (e.g., a MAC address, an AID, or another suitable network address) corresponding to the client station 134-1.

In an embodiment, the legacy 802.11 preamble 210 spans a first frequency bandwidth, and the wakeup preamble 228 and the wakeup packet data portion 232 span a second frequency bandwidth that is narrower than the first frequency bandwidth. For example, the first frequency bandwidth is 20 MHz and the second frequency bandwidth is a narrower bandwidth such as approximately 4 MHz (e.g. 4.06 MHz), or another suitable narrower bandwidth such as 1 MHz, 2 MHz, 5 MHz, 10 MHz, etc. In an embodiment, the first frequency bandwidth is the bandwidth of the component channel of the operating channel of the AP 114 in which the wakeup packet 200 is transmitted and the second bandwidth is the bandwidth of the WUR operating channel of the client station (or stations) 134 to which the packet 200 is addressed.

Figure 3:
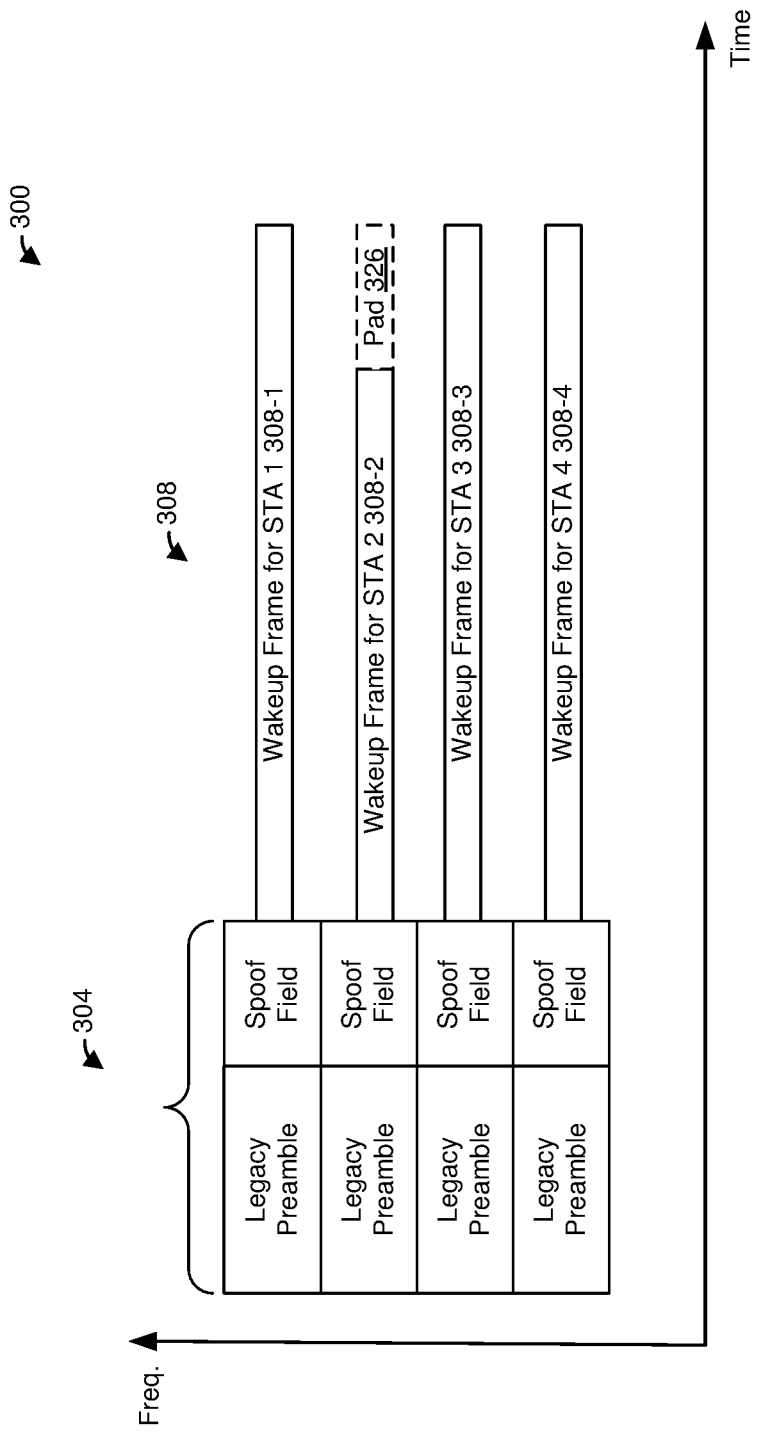
FIG. 3 is a block diagram of an example wakeup packet, according to another embodiment.

FIG. 3 is a block diagram of a wakeup packet 300 used in the example WLAN 110 of FIG. 1, according to another embodiment. The wakeup packet 300 is a frequency division multiple access (FDMA) multi-user (MU) wakeup packet, in an embodiment. The wireless network interface device 122 of the AP 114 is configured to generate and transmit the wakeup packet 300, according to an embodiment, to simultaneously prompt wireless network interfaces devices 142 of multiple client stations 134 to wake up from a low power state (e.g., transition from a low power state to an active state). The wakeup packet 300 spans multiple component channels of the operating channel of the wireless network interface device 122 of the AP 114, in an embodiment. The wakeup packet 300 includes respective wakeup frames addressed to respective client stations (or groups of client stations 134) transmitted in respective component channels previously negotiated between the AP 114 and the client stations 134, in an embodiment.

The wakeup packet 300 includes a preamble 304. The preamble 304 corresponds to the preamble 204 of the packet 200 of FIG. 2 duplicated in each of the multiple component channels spun by the wakeup packet 300. The wakeup packet 300 also includes a plurality of wakeup frames 308. Each wakeup frame 308 is the same as or similar to the wakeup frame 208 of the wakeup packet 200 of FIG. 2, in an embodiment. Each wakeup frame 308 includes a wakeup preamble and a wakeup body portion, in an embodiment. Each wakeup frame 308 include (e.g., in a wakeup packet body portion) an address corresponding to one or more client stations 134. Each respective wakeup frame 308 includes (e.g., in a wakeup packet body portion) an address corresponding to a respective client station (or a group of client stations) 134, in an embodiment.

In the illustrated embodiment, the wakeup packet 300 spans four component channels of the operating channel of the wireless network interface device 122 of the AP 114, and the wakeup packet 300 includes four wakeup frame 308 respectively transmitted in respective ones of the four component channels of the operating channel of the wireless network interface device 122 of the AP 114. In an embodiment, the four wakeup frames 308 include a first wakeup frame 308-1 that includes an address corresponding to a first client station 134 (STA1) and is transmitted in a first component channel corresponding to a wakeup radio operating channel previously negotiated between the AP 114 and STA1, a second wakeup frame 308-2 that includes an address corresponding to a second client station 134 (STA2) and is transmitted in a second component channel corresponding to a wakeup radio operating channel previously negotiated between the AP 114 and STA2, a third wakeup frame 308-3 that includes an address corresponding to a second client station 134 (STA3) and is transmitted in a third component channel corresponding to a wakeup radio operating channel previously negotiated between the AP 114 and STA3, a fourth wakeup frame 308-4 that includes an address corresponding to a fourth client station 134 (STA4) and is transmitted in a fourth component channel corresponding to a wakeup radio operating channel previously negotiated between the AP 114 and STA4. In other embodiments, the wakeup packet 300 spans a number component channels different than four component channels and the wakeup packet 300 includes a corresponding number of wakeup frames 308 different than four wakeup frames 308.

In an embodiment, the wireless network interface device 122 is configured to encode and modulate the wakeup frames 308 for transmission in the respective component channels of the operating channel of the wireless network interface device 122. In an embodiment, the wireless network interface device 122 is configured to encode and modulate the wakeup frames 308 using a same modulation and coding scheme (MCS) to modulate and encode each of the wakeup frames 308. In another embodiment, different MCSs are used to modulate and encode respective ones of at least some of the wakeup frames 308. For example, LP-WURs of respective client stations 134 support different MCSs, and the wireless network interface device 122 is configured to use respective supported MCSs to modulate and encode respective wakeup frames 134 for transmission to the corresponding client stations 134, in an embodiment.

In an embodiment, the wakeup packet 300 includes at least one wakeup frame 308 that is of a shorter length compared to one or more mother wakeup frames 308. For example, the wakeup frame 308-2 for transmission to STA2 is of a shorter length as compared to the length of the wakeup frames 308-1, 308-3 and 308-4 for transmission to, respectively STA1, STA3 and STA4, in the illustrated embodiment. In an embodiment, the shorter length of the wakeup frame 304-2 is due to the wakeup frame 308-2 being encoded and modulated according to a higher MCS (e.g., higher coding rate and/or higher modulation scheme) supported by the LP-WUR 150 of STA2 as compared to an MCS used to encode and modulate the wakeup frames 308-1, 308-3 and 308-4 supported by the LP-WURs of STA1, STA3 and STA4, in an embodiment. Additionally or alternatively, the shorter length of the wakeup frame 304-2 is due to different amount of information included in the wakeup frame 304-2 as compared to the amount of information included in the wakeup frames 308-1, 308-3 and 308-4. For example, the wakeup frames 308-1, 308-3 and 308-4 are standard wakeup frames generated according to a standard format supported by the LP-WURs of STA1, STA3 and STA4, while the wakeup frame 308-2 is a custom wakeup frame generated according to a custom (e.g., proprietary) format supported by the LP-WUR of STA 2, in an embodiment. In another embodiment, all wakeup frames 308 are of the same lengths.

In an embodiment, the wireless network interface device 122 is configured to pad the at least one wakeup frame 308 that is of a shorter length, for example by appending one or more padding bits or one or more modulation symbols to the at least one wakeup frame 308, to equalize the lengths of the wakeup frames 308. For example, the wireless network interface device 122 generates the shorter wakeup frame 308-2 to include a padding portion 326 to equalize the length of the wakeup frame 308-2 with the lengths of the wakeup frames 308-1, 308-3 and 308-4, in the illustrated embodiment. In other embodiments, the shorter wakeup frame 308-2 omits the padding portion 326. In this embodiment, the packet 300 includes wakeup frames 308 of unequal lengths.

In an embodiment, the AP 114 (e.g., the wireless network interface device 122) and the client stations 134 (e.g., the wireless network interface device 142) contend for a communication medium using CCA mechanisms, such as carrier sense multiple access with collision avoidance (CSMA/CA) mechanism or another suitable channel assessment mechanism. In an embodiment, the AP 114 and the client stations 154 maintain respective network allocation vectors (NAVs) that include timers for tracking when another communication device has seized control or "ownership" of a wireless communication medium. For example, when a communication device (e.g., the AP 114 or a client station 154) receives a transmitted PHY data unit (e.g., the PHY data unit 200 of FIG. 2 or another suitable PHY data unit) that conforms to a particular communication protocol (e.g., the IEEE 802.11 Standard, a future version of the IEEE 802.11 Standard, or another suitable communication protocol), or at least includes a preamble that conforms to the particular communication protocol, the communication device examines duration information included in a header or the preamble of the PHY data unit, where the duration information indicates a length of time that another communication device has taken ownership of a communication medium. The communication device then uses the duration information in the PHY data unit to set a NAV timer, and the NAV timer begins to decrement. When a value of the NAV timer is non-zero, this indicates that another communication device owns the communication medium and that the communication device therefore should generally refrain from transmitting. On the other hand, when the value of the NAV timer reaches zero, this indicates that the communication medium is not currently owned by another communication device.

In an embodiment, when the NAV is zero, the communication device implements a physical carrier sensing and energy detection procedure in which the communication device senses an energy level of the medium for a predetermined length of time, such as a length of time corresponding to a distributed coordination function (DCF) interframe space (DIFS) time period or another suitable time period, in an embodiment. If detected energy in the medium during the predetermined length of time remains below a threshold, then the communication device invokes a backoff procedure in which the communication device continues to detect energy level of the medium, to determine whether medium is busy or idle, for an additional deferral time period. In an embodiment, the backoff procedure includes randomly or pseudorandomly choosing an initial value for the backoff timer when the current value of the backoff timer is zero. In an embodiment, the communication device chooses the initial value for the backoff timer from a range of initial values [0, CW], where CW is a contention window parameter, where the initial value and CW are in units of slots, and where each slot corresponds to a suitable time period. For example, the IEEE 802.11 Standard defines slot times of 20 microseconds (IEEE 802.11b) and 9 microseconds (IEEE 802.11a, 11n, and 11ac), where different slot times are used for different versions of the protocol. In an embodiment, CW is initially set to a minimum value CWmin. However, after each failed transmission attempt (e.g., failure to receive an acknowledgment of the transmission), the value of CW is approximately doubled with an upper bound of CWmax. The parameters CWmin and CWmax are also in units of slots.

In an embodiment, while the communication device determines that the medium is idle, the communication device decrements the backoff timer. When the communication device determines that the communication medium is busy, the communication device pauses the backoff timer and does not resume decrementing the backoff timer until the communication medium is subsequently determined to be idle. In an embodiment, setting the backoff timer to an initial value chosen randomly or pseudo-randomly (e.g., as described above) ensures that backoff timers of different communication devices in the network tend to reach zero at different times. In an embodiment, when the backoff timer reaches zero, the communication device determines that the communication device is free to transmit.

In an embodiment, when a communication device (e.g., the AP 114 or a client station 154) determines that a primary channel is idle based on CCA/backoff operations performed in the primary channel, the communication device also checks one or more non-primary channels to determine whether the one or more non-primary channels can be utilized for transmission along with the primary channel. For example, in an embodiment, the communication device senses an energy level corresponding to the one or more non-primary channels for a predetermined length of time, such as a length of time corresponding to point coordination function (PCF) interframe space (PIFS) time period, immediately preceding expiration of the backoff timer corresponding to the primary channel. If detected energy level corresponding to one or more of the non-primary channels is below a threshold, the communication device determines that these one or more of the non-primary channels are also idle. When the backoff timer reaches zero, the communication device can transmit in a composite channel that includes the primary channel and the one or more non-primary channels determined to be idle, in an embodiment, in an embodiment.

In an embodiment, the wireless network interface device 122 of the AP 114 is configured to perform CCA/backoff procedures prior to transmission of a wakeup packet, such as the wakeup packet 200 of FIG. 2 or the wakeup packet 300 of FIG. 2. In an embodiment, when transmitting the wakeup packet 200 that includes a single wakeup frame and is to be transmitted in a particular component channel of the operating channel of the wireless network interface device 122 of the AP 114, the AP 114 performs backoff procedures CCA/backoff procedures based on the particular component channel of the operating channel of the wireless network interface device 122 of the AP 114 (e.g., using the particular component channel as the primary channel for the purpose of CCA/backoff procedures).

Figure 4:
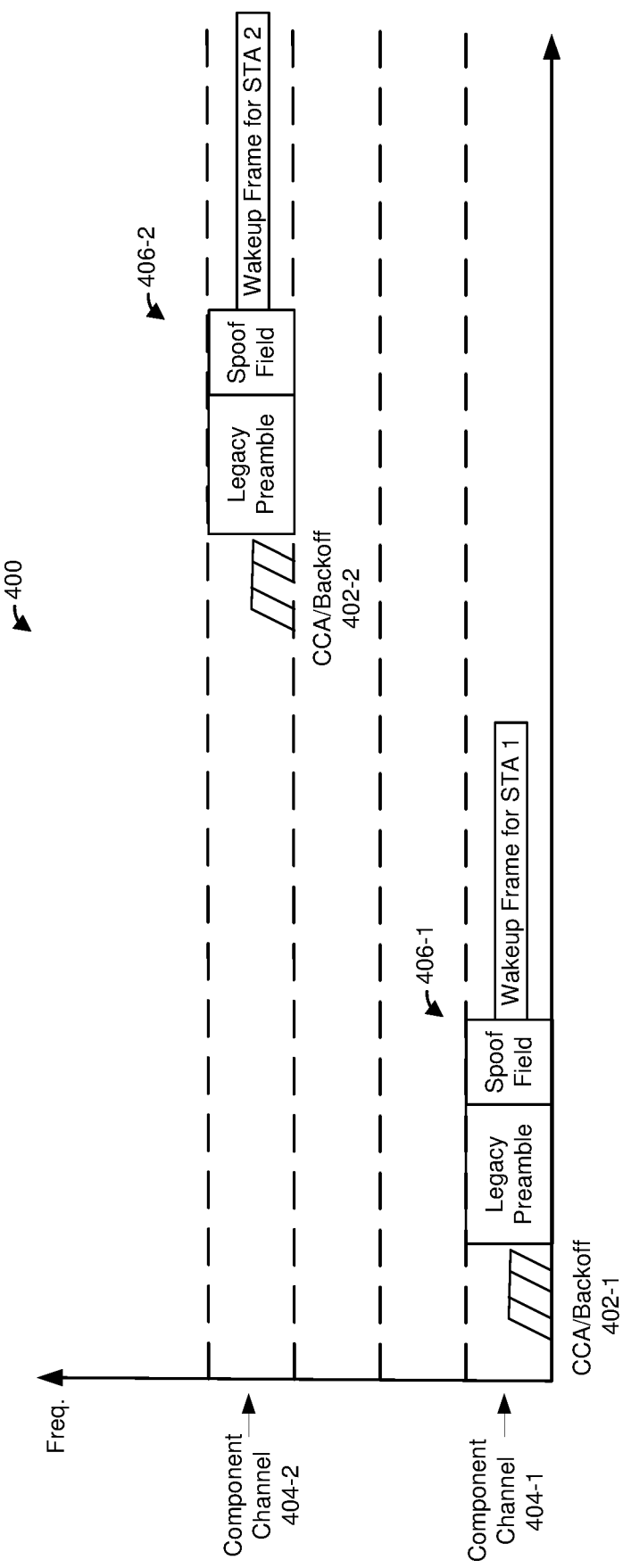
FIG. 4 is a diagram of an example transmission sequence of sequentially transmitted wakeup packets, according to an embodiment.

FIG. 4 is a diagram of an example transmission sequence 400 in which the AP 114 sequentially transmits respective wakeup packets, such as SU or MU wakeup packet 200 of FIG. 2, that span respective component channels of the wireless network interface device 122 of the AP 114, according to an embodiment. In an embodiment, the wireless network interface device 122 of the AP 114 performs a CCA/backoff procedure 402-1 based on a component channel 404-1 for transmission of a wakeup packet 406-1 to a first client station 134 (STA1) in the component channel 404-1. When the wireless network interface device 122 determines based on the CCA/backoff procedure 402-1 that the component channel 404-1 is idle, the wireless network interface device 122 transmits the wakeup packet 406-1 to STA1 in the component channel 404-1. Subsequently, the wireless network interface device 122 of the AP 114 switches CCA/backoff operation to a component channel 404-2 to prepare for transmission of a wakeup packet 406-2 to a second client station 134 (STA2) in the component channel 404-2. In an embodiment, switching CCA/backoff operation to the component channel 404-2 includes resetting a NAV timer to a duration value corresponding to the component channel 404-2. In an embodiment, the wireless network interface device 122 resets the NAV timer based on a duration indication in a header or preamble of a valid PPDU that the wireless network interface device 122 receives in the component channel 404-2 upon switching CCA/backoff operation to the component channel 404-2. In another embodiment, the wireless network interface device 122 resets the NAV timer to a predetermined value, such as a predetermined NAVSYNCDELAY value, upon switching CCA/backoff operation to the component channel 404-2. In yet another embodiment, the wireless network interface device 122 does not reset the NAV timer upon switching CCA/backoff operation to the component channel 404-2. For example, the wireless network interface device 122 carries over the value of the NAV timer from the component channel 404-1 to the component channel 404-2, in an embodiment.

Upon switching CCA/backoff operations to the component channel 404-2, the wireless network interface device 122 performs a CCA/backoff procedure 402-2 based on the component channel 404-2, in an embodiment. When the wireless network interface device 122 determines based on the CCA/backoff procedure 402-2 that the component channel 404-2 is idle, the wireless network interface device 122 transmits the wakeup packet 406-2 to STA2 in the component channel 404-2, in an embodiment.

Figure 5:
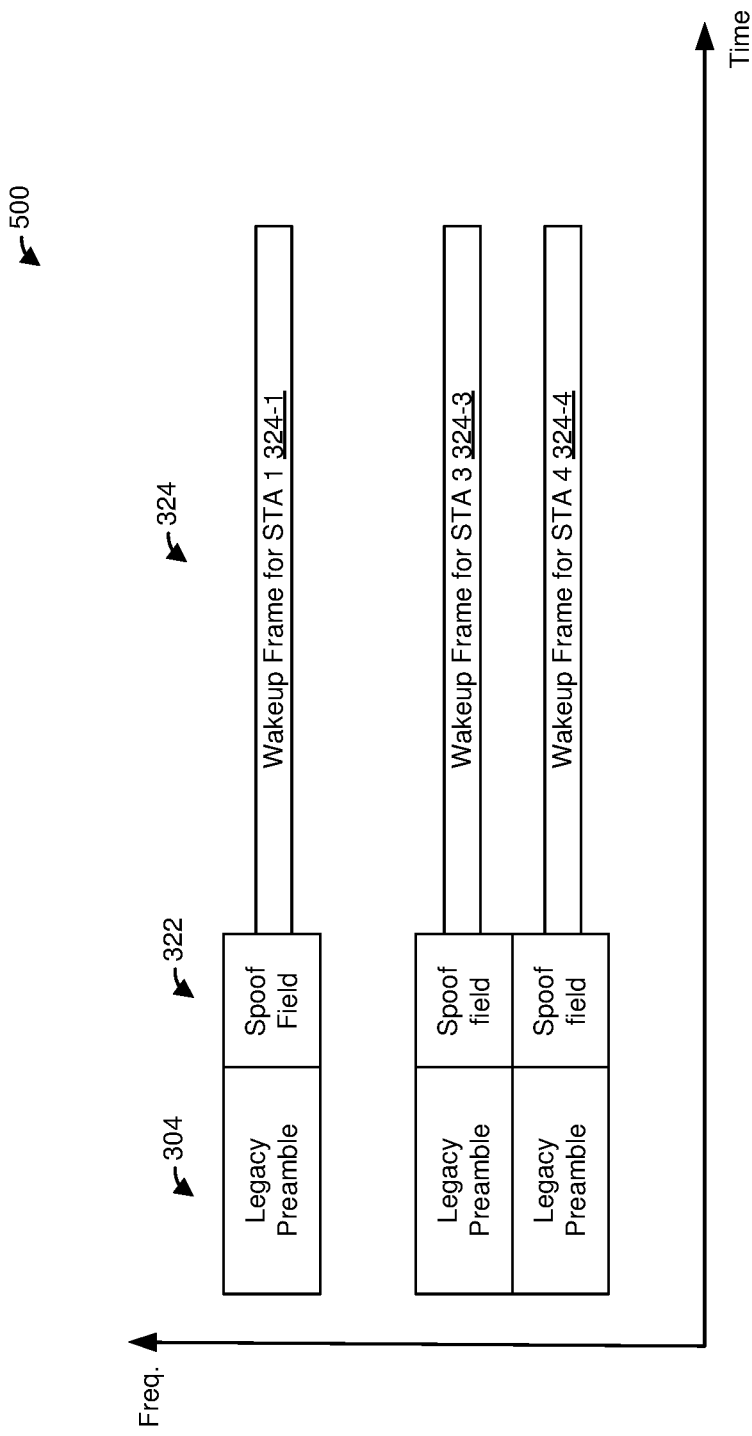
FIG. 5 is a diagram of an example transmission of a frequency division multiple access (FDMA) wakeup packet, according to an embodiment.

FIG. 5 is a diagram of an example transmission 500 of an FDMA MU wakeup packet, such as the wakeup packet 300 of FIG. 3, that includes respective wakeup frames in respective component channels of the operating channel of the wireless network interface device 122 of the AP 114, according to an embodiment. In an embodiment, when attempting to transmit an FDMA MU wakeup packet, such as the wakeup packet 300 of FIG. 3, to multiple client stations 134, the wireless network interface device 122 of the AP 114 selects a particular one of the component channels in which the wakeup frames are to be transmitted to be used for CCA/backoff operations. The wireless network interface device 122 performs a CCA/backoff in the selected particular one of the component channels. When the wireless network interface device 122 determines based om the CCA/backoff operations performed in the selected particular one of the component channels that the particular one of the component channels is idle, the wireless network interface device 122 also the other component channels in which the wakeup frames are to be transmitted to determine whether the other component channels can be utilized for transmission along with the selected particular one of the component channels. If the wireless network interface device 122 determines that the other component channels in which the wakeup frames are to be transmitted can be utilized for transmission along with the selected particular one of the component channels, the wireless network interface device 122 transmits the wakeup packet including the wakeup frame in the selected particular one of the component channels and the wakeup frames in the other component channels. On the other hand, if the wireless network interface device 122 determines that one or more of the other component channels in which the wakeup frames are to be transmitted cannot be utilized for transmission along with the selected particular one of the component channels, the wireless network interface device 122 punctures portions of the wakeup packet corresponding to the one or more of the other component channels that cannot be utilized for transmission, and transmits the punctured wakeup packet that excludes the wakeup frames corresponding to the one or more of the other component channels that cannot be utilized for transmission, in an embodiment.

Referring still to FIG. 5, the transmission 500 includes transmission of the wakeup packet 300 of FIG. 3 without the portion of the wakeup packet 300 that includes the wakeup frame 308-2 to STA2. In an example scenario, the wakeup packet 300 of FIG. 3 is transmitted without the portion of the wakeup packet 300 that includes the wakeup frame 308-2 to STA2 because the wireless network interface device 122 does not intend to prompt STA2 to transition to an active state, in an embodiment. In this scenario, the wireless network interface device 122 does not select the component channel corresponding to the wakeup radio operating channel of STA2 as the particular channel to be used for CCA/backoff operations, and does not attempt to determine that the component channel corresponding to the wakeup radio operating channel of STA2 can be utilized for transmission along with the particular one of the component channels selected for CCA/backoff operations. In another example scenario, the wireless network interface device 122 determines that the component channel corresponding to the wakeup radio operating channel of STA2 cannot be utilized for transmission along with the particular one of the component channels selected for CCA/backoff operations. In this scenario, the wireless network interface device 122 punctures the portion of the wakeup packet 300 corresponding to the component channel that includes the wakeup radio operating channel of STA2 prior to transmission of the wakeup packet 300, in an embodiment. Further, in this scenario, after transmitting the wakeup packet 300, the wireless network interface device 122 switches the CCA/backoff operations to the component channel that corresponds to the wakeup radio operating channel of STA2 to again attempt to transmit the wakeup frame 308-2 to STA2, in an embodiment.

In an embodiment, upon transitioning to an active state in response to receiving a wakeup signal generated by an LP-WUR (e.g., the LP-WUR 150) of a client station 134, a wireless network interface device (e.g., the wireless network interface device 142) of the client station 134 attempts a transmission to the AP 114, for example a transmission solicited by a wakeup frame received by the LP-WUR 150 from the AP 114. For example, the wireless network interface device 142 initiates a CCA/backoff procedure to attempt the transmission, in an embodiment. In an embodiment, the wireless network interface device 142 is configured to purposely delay attempting a transmission immediately after the end of the wakeup frame received from the AP 114 to ensure that the transmission does not occur until the end of the transmission of the entire wakeup packet that includes the wakeup frame, even if the wakeup frame is of a shorter length than the lengths of the entire wakeup packet.

In an embodiment, the AP 114 (e.g., the wireless network interface device 122) is configured to announce a delay time period indicating a minimum delay time by which client stations 134 are to delay transmissions after the end of a wakeup frame received from the AP 114. The delay time period is configured to ensure that transmissions by the client stations 134 will not be initiated before the end of a wakeup packet that includes wakeup frames for the client stations 134, even if a particular wakeup frame is of a shorter length than the length of the entire wakeup packet that includes the packet frame. In an embodiment, the wireless network interface device 122 is configured to include an indication of the delay time period in a management frame or action frame that conforms to the IEEE 802.11 Standard or other wireless communication protocol according to which the wireless network interface devices of the client stations 134 are configured to operate, in an embodiment. For example, the wireless network interface device 122 is configured to include an indication of the delay time period in an IEEE 802.11 beacon frame, an IEEE 802.11 association response frame, an IEEE 802.11 probe response frame or another suitable frame, such as a frame specifically designated for announcement of wakeup radio operation parameters. The wireless network interface device 142 of the client station 134 is configured to receive the indication of the delay time period and to delay attempting transmissions by the indicated delay time period after the end of a wakeup frame received from the AP 114, in an embodiment. In another embodiment, the delay time period is a predetermined delay time period to be used by the client stations 134. In this embodiment, the AP 114 does not need to indicate the delay time period to the client stations 134.

Figure 6:
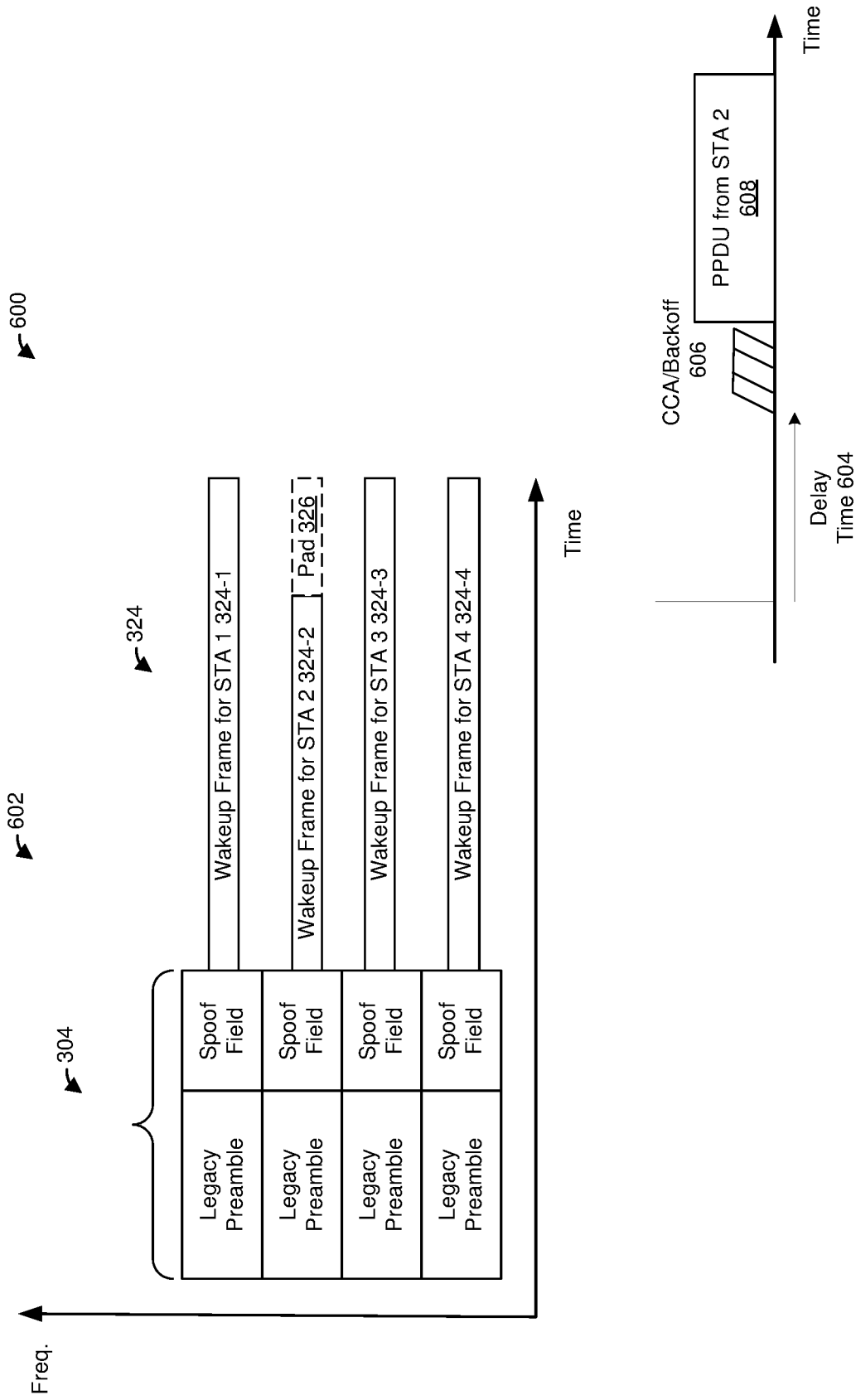
FIG. 6 is a block diagram of a transmission exchange between an access point (AP) and a client station, according to an embodiment

FIG. 6 is a block diagram of a transmission exchange 600 between the AP 114 and a client station 134, according to an embodiment. The AP 114 (e.g., the wireless network interface device 122) generates and transmits a wakeup packet 602. The wakeup packet 602 corresponds to the wakeup packet 300 of FIG. 3, in an embodiment. The wakeup packet 600 includes the wakeup frame 308-2, addressed to STA2, that is of a shorter length than the other wakeup frames 308. In an embodiment, STA2 determines the length of the wakeup frame 308-2 based on a length indication in a wakeup preamble of the wakeup frame 308-2. STA2, however, does attempt a transmission to the AP 114 immediately after the end of the wakeup frame 308-2 because such transmission would collide with the still on-going transmission of the wakeup packet 300. Instead, STA2 delays attempting transmission to the AP 114 by a delay time period 604 after the end of the wakeup frame 308-2. After the delay time period 604, STA2 performs a CCA/backoff procedure 606, and transmits a PPDU 608 to the AP 114 when the channel is determined to be idle and available based on the CCA/backoff procedure 606. Transmission of the PPDU 608 is solicited by the wakeup frame 308-2, in an embodiment. Delaying the time at which the CCA/backoff procedure 606 is initiated by the delay time period 604 after the end of the wakeup frame 308-2 ensures that transmission of the PPDU 608 will not begin before the end of the wakeup packet 300, in an embodiment.

In an embodiment, the AP 114 (e.g., the wireless network interface device 122) is configured to periodically transmit wakeup radio beacon frames to allow LP-WURs (e.g., LP-WUR 150) of the client stations 134 to sink with the AP 114. In an embodiment, the wireless network interface device 122 is configured to transmit the beacon frames in FDMA duplicate mode in which a beacon frame is duplicated in each component channel of the operating channel of the AP 114. Transmitting the beacon frames in FDMA duplicate mode allows LP-WURs of the client stations 134 to receive the beacon frames in the negotiated respective component channels in which the respective LP-WURs are operating.

In another embodiment, the wireless network interface device 122 is configured to transmit the beacon frames in non-duplicate mode in only a single component channel (e.g., the primary component channel or a secondary component channel) of the operating channel of the AP 114. In an embodiment, the wireless network interface device 122 is configured to indicate to the client stations 134 (e.g., to the wireless network interfaces 142) the particular component channel used for wakeup radio beacon transmissions and a schedule (e.g., target beacon transmission time (TBTT)) for the wakeup radio beacon transmissions. The wireless network interface device 122 is configured to include indications of the particular component channel and/or the schedule (e.g., target beacon transmission time (TBTT)) in a management frame or action frame that conforms to the IEEE 802.11 Standard or other wireless communication protocol according to which the wireless network interface devices of the client stations 134 are configured to operate, in an embodiment. For example, the wireless network interface device 122 is configured to include indications of the particular component channel and/or the schedule (e.g., target beacon transmission time (TBTT)) in an IEEE 802.11 beacon frame, an IEEE 802.11 association response frame, an IEEE 802.11 probe response frame or another suitable frame, such as a frame specifically designated for announcement of wakeup radio operation parameters. The wireless network interface device 142 of the client station 134 is configured to receive indications of the particular component channel and/or the schedule (e.g., target beacon transmission time (TBTT)) and to configure the LP-WUR 150 to tune to the particular component channel at the designated times to receive the wakeup radio beacon frames, in an embodiment.

Figure 7:
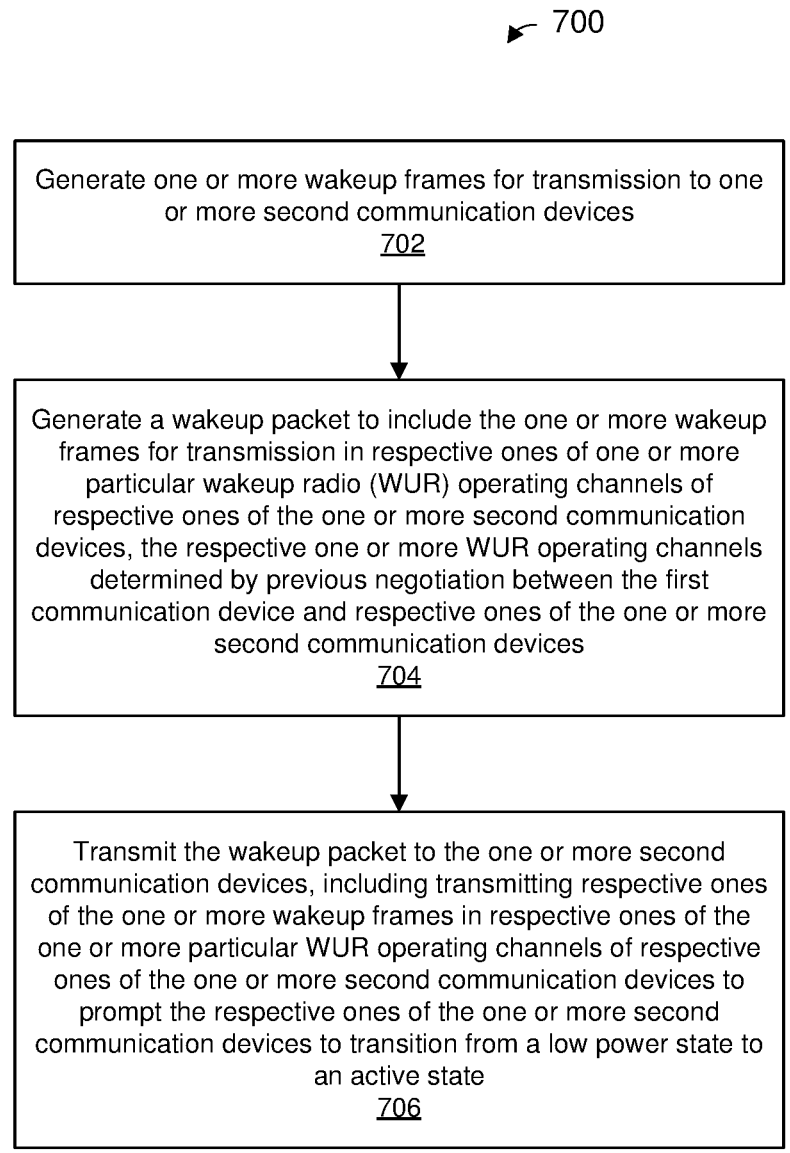
FIG. 7 is a flow diagram of an example method for generating wakeup packets, according to an embodiment.

FIG. 7 is a flow diagram of an example method 700 for generating wakeup packets, according to an embodiment. In some embodiments, the wireless network interface device 122 of FIG. 1 is configured to implement the method 700. The method 700 is described, however, in the context of the wireless network interface device 122 merely for explanatory purposes and, in other embodiments, the method 700 is implemented by another suitable device, such as the wireless network interface device 142.

At block 702, the wireless network interface device 122 generates one or more wakeup frames for transmission to one or more client stations. For example, the wireless network interface device 122 generates the wakeup frame 224 of FIG. 2, in an embodiment. As another example, the wireless network interface device 122 generates the wakeup frames 308 of FIG. 3, in another embodiment. In other embodiments, the wireless network interface device 122 generates one or more suitable wakeup frames different from the wakeup frame 224 of FIG. 2 or the wakeup frames 308 of FIG. 3.

At block 704, the wireless network interface device 122 generates a wakeup packet to include the one or more wakeup frames generated at block 702. For example, in an embodiment, the wireless network interface device 122 generates the wakeup packet 200 of FIG. 2. In another embodiment, the wireless network interface device 122 generates the wakeup packet 300 of FIG. 3. In other embodiments, the wireless network interface device 122 generates a suitable wakeup packet different from the wakeup packet 200 of FIG. 2 or the wakeup packet 300 of FIG. 2. In an embodiment, the wakeup packet includes the wakeup frames for transmission in respective ones of one or more particular wakeup radio operating channels of respective ones of the one or more client stations. In an embodiment, the respective one or more operating channels were previously negotiated between the wireless network interface device 122 and respective ones of the one or more second client stations.

At block 706, the wireless network interface device 122 transmits the wakeup packet to the one or more client stations, In an embodiment, the wireless network interface device 122 transmits respective ones of the one or more wakeup frames in respective ones of the one or more particular wakeup radio operating channels of respective ones of the one or more client stations. In an embodiment, the wireless network interface device 122 transmits the wakeup packet to prompt the respective ones of the one or more client stations to transition from a low power state to an active state. Negotiating wakeup radio channels with client stations provides flexibility of allowing LP-WURs of different client stations to operate in different wakeup radio channels, in an embodiment. For example, transmitting the wakeup packet having the respective wakeup frames in respective wakeup radio operating channels determined by previous negotiation with the client stations allows the wireless network interface device 122 to simultaneously prompt multiple client stations, operating in different wakeup radio operating channels, to transition to active states, in an embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for wireless communications, comprising:
  establishing, by an access point, a first communication channel as a primary channel of the access point;
  transmitting, by the access point, wakeup radio (WUR) beacon frames via a second communication channel that corresponds to a WUR primary channel, wherein the second communication channel is different than the first communication channel;
  negotiating with a first client station, at the access point, a third communication channel via which the access point is to transmit wakeup frames for the first client station, the third communication channel being different than the second communication channel;
  generating, at the access point, a first wakeup frame for transmission to the first client station via the third communication channel;
  generating, at the access point, a wakeup packet to include at least the first wakeup frame; and
  transmitting, by the access point, the wakeup packet, including transmitting the first wakeup frame to the first client station via the third communication channel.

2. The method of claim 1, further comprising:
switching, at the access point, channel access operations of the access point from the first communication channel to the third communication channel; and
performing, by the access point, a backoff procedure in the third communication channel to determine when the third communication channel is available for transmission of the first wakeup frame to the first client station.

3. The method of claim 2, wherein switching channel access operations of the access point includes resetting a channel access timer to one of i) a duration value obtained from a data unit received by the access point in the third communication channel, and ii) a predetermined duration value.

4. The method of claim 1, further comprising:
negotiating, at the access point and with multiple client stations, respective communication channels, within an operating channel of the access point, via which respective wakeup frames are to be transmitted to the multiple client stations, including negotiating, with the first client station, the third communication channel via which the access point is to transmit wakeup frames for the first client station; and
generating, at the access point, multiple wakeup frames that include at least i) the first wakeup frame for transmission to the first client station, and ii) a second wakeup frame for transmission to a second client station;
wherein generating the wakeup packet comprises generating the wakeup packet to include the multiple wakeup frames for transmission in the respective communication channels; and
wherein transmitting the wakeup packet is in order to prompt the multiple client stations to transition from the low power state to the active state, and wherein transmitting the wakeup packet comprises i) transmitting the first wakeup frame to the first client station via the third communication channel and ii) transmitting the second wakeup frame to the second client station via a fourth communication channel.

5. The method of claim 4, further comprising:
in connection with transmitting the packet, performing, at the access point, a backoff procedure in the first communication channel to determine when the access point is permitted to transmit the wakeup packet;
in connection with performing the backoff procedure in the first communication channel, determining, at the access point, whether one or more communication channels different than the first communication channel are idle, wherein the first communication channel and the one or more communication channels different than the first communication channel are within the operating channel; and
transmitting, by the access point, the wakeup packet in the first communication channel and one or more other communication channels within the operating channel that are determined to be idle.

6. The method of claim 5, transmitting the wakeup packet comprises not transmitting in one or more communication channels within the operating channel that are determined to be busy.

7. A communication device, comprising:
a wireless network interface device associated with an access point, the wireless network interface device having one or more integrated circuit (IC) devices configured to:
establish a first communication channel as a primary channel of the access point,
control the wireless network interface device to transmit wakeup radio (WUR) beacon frames via a second communication channel that corresponds to a WUR primary channel, wherein the second communication channel is different than the first communication channel,
negotiate, with a first client station, a third communication channel via which the access point is to transmit wakeup frames for the first client station, the third communication channel being different than the second communication channel,
generate a first wakeup frame for transmission to the first client station via the third communication channel,
generate a wakeup packet to include at least the first wakeup frame, and
control the wireless network interface device to transmit the wakeup packet, including transmitting the first wakeup frame to the first client station via the third communication channel.

8. The communication device of claim 7, wherein the one or more IC devices are further configured to:
switch channel access operations of the access point from the first communication channel to the third communication channel; and
perform a backoff procedure in the third communication channel to determine when the third communication channel is available for transmission of the first wakeup frame to the first client station.

9. The communication device of claim 8, wherein the one or more IC devices are further configured to, as part of switching channel access operations of the access point:
reset a channel access timer to one of i) a duration value obtained from a data unit received by the access point in the third communication channel, and ii) a predetermined duration value.

10. The communication device of claim 7, wherein the one or more IC devices are further configured to:
negotiate, with multiple client stations, respective communication channels, within an operating channel of the access point, via which respective wakeup frames are to be transmitted to the multiple client stations, including negotiating, with the first client station, the third communication channel via which the access point is to transmit wakeup frames for the first client station; and
generate multiple wakeup frames that include at least i) the first wakeup frame for transmission to the first client station, and ii) a second wakeup frame for transmission to a second client station;
generate the wakeup packet to include the multiple wakeup frames for transmission in the respective communication channels; and
control the wireless network interface device to transmit the wakeup packet in order to prompt the multiple client stations to transition from the low power state to the active state, and wherein transmitting the wakeup packet comprises i) transmitting the first wakeup frame to the first client station via the third communication channel and ii) transmitting the second wakeup frame to the second client station via a fourth communication channel.

11. The communication device of claim 10, wherein the one or more IC devices are further configured to:

in connection with transmitting the wakeup packet, perform a backoff procedure in the first communication channel to determine when the communication device is permitted to transmit the wakeup packet;

in connection with performing the backoff procedure in the first communication channel, determine whether one or more communication channels different than the first communication channel are idle, wherein the first communication channel and the one or more communication channels different than the first communication channel are within the operating channel; and control the wireless network interface device to transmit the wakeup packet in the first communication channel and one or more other communication channels within the operating channel that are determined to be idle.

12. The communication device of claim 11, wherein the one or more IC devices are further configured to control the wireless network interface device to not transmit in one or more communication channels within the operating channel that are determined to be busy.

13. The communication device of claim 7, further comprising:
one or more wireless transceivers implemented on the one or more IC devices.

14. The communication device of claim 13, further comprising:
one or more antennas coupled to the one or more wireless transceivers.

15. A method for wireless communications, comprising:
determining, at a client station, that a first communication channel is a primary channel of an access point;
tuning a wakeup radio of the client station to a second communication channel that corresponds to a wakeup radio (WUR) primary channel of the access point when the access point is to transmit WUR beacon frames, wherein the second communication channel is different than the first communication channel;
receiving, at the client station, WUR beacon frames via the second communication channel;
negotiating with the access point, at the client station, a third communication channel via which the client station is to receive wakeup frames for the client station, the third communication channel being different than the second communication channel;
tuning the wakeup radio of the client station to the third communication channel to receive wakeup frames;
receiving, at the client station, a first wakeup frame via the third communication channel;
in response to receiving the first wakeup frame, transitioning a wireless network interface of the client station to an active state; and
after transitioning the wireless network interface of the client station to the active state, transmitting, by wireless network interface of the client station, a packet via the first communication channel.

16. A communication device, comprising:
one or more integrated circuit (IC) devices;
a wireless network interface device associated with a client station, the wireless network interface device implemented on the one or more IC devices and being configured to:
determine that a first communication channel is a primary channel of an access point, and
negotiate, with the access point, a second communication channel via which the client station is to receive wakeup frames for the client station; and
a wakeup radio coupled to the wireless network interface device, the wakeup radio implemented on the one or more IC devices, wherein the wakeup radio is configured to:
tune to a third communication channel that corresponds to a wakeup radio (WUR) primary channel of the access point when the access point is to transmit WUR beacon frames, wherein the second communication channel is different than the first communication channel,
receive WUR beacon frames via the third communication channel,
tune the wakeup radio to the second communication channel to receive wakeup frames,
receive a first wakeup frame via the second communication channel, and
in response to receiving the first wakeup frame, prompt the wireless network interface to transition to an active state; and
wherein the wireless network interface device is configured to, after transitioning to the active state, transmit a packet via the first communication channel.

17. The communication device of claim 16, further comprising:
one or more wireless transceivers implemented on the one or more IC devices.

18. The communication device of claim 17, further comprising:
one or more antennas coupled to the one or more wireless transceivers.

* * * * *